US012746756B2

(12) United States Patent
Han et al.

(10) Patent No.: US 12,746,756 B2
(45) Date of Patent: Sep. 29, 2026

(54) APPARATUS FOR SUPPLYING INK, AND INKJET PRINTING SYSTEM INCLUDING THE SAME

(71) Applicant: AP SYSTEMS INC., Hwaseong-Si (KR)

(72) Inventors: Woo Jong Han, Osan-si (KR); Jeong Ho Kim, Seoul (KR); Tae Jun Um, Seoul (KR); Seok Jae Ryu, Goyang-si (KR)

(73) Assignee: AP SYSTEMS INC. (KR)

( * ) Notice: Subject to any disclaimer, the term of this patent is extended or adjusted under 35 U.S.C. 154(b) by 183 days.

(21) Appl. No.: 18/677,843

(22) Filed: May 29, 2024

(65) Prior Publication Data

US 2025/0001765 A1 Jan. 2, 2025

(30) Foreign Application Priority Data

Jun. 29, 2023 (KR) ........................ 10-2023-0084477

(51) Int. Cl.
*B41J 2/175* (2006.01)

(52) U.S. Cl.
CPC ....... *B41J 2/17596* (2013.01); *B41J 2/17556* (2013.01); *B41J 2002/17573* (2013.01)

(58) Field of Classification Search
CPC ................ B41J 2/17596; B41J 2/17556; B41J 2002/17573
See application file for complete search history.

(56) References Cited

U.S. PATENT DOCUMENTS 5,205,216 A * 4/1993 Okamura ................ B41F 31/06 101/367
2004/0056918 A1* 3/2004 Wang ......................... B41J 2/19 347/22
2010/0110155 A1* 5/2010 Delueg ...................... B41J 2/18 347/93
2015/0070415 A1* 3/2015 Ishikawa .................... B41J 2/18 347/6
2020/0079100 A1* 3/2020 Mizuno .................... B41J 2/175

FOREIGN PATENT DOCUMENTS

JP H04141421 A 5/1992
KR 20080098266 A 11/2008
KR 101989375 B1 6/2019

* cited by examiner

*Primary Examiner* — Jason S Uhlenhake
(74) *Attorney, Agent, or Firm* — Renaissance IP Law Group LLP

(57) ABSTRACT

Provided are an apparatus for supplying ink and an inkjet printing system including the same, and more particularly, to an apparatus for supplying ink, which may effectively circulate ink for inkjet printing to stably maintain a state of the ink, and an inkjet printing system including the same. The apparatus for supplying ink includes an ink storage unit configured to store ink at least temporarily, a first passage tube configured to supply the ink stored in the ink storage unit to an inkjet head unit, a second passage tube configured to collect the ink from the inkjet head unit, an ink circulation unit configured to move the ink introduced through the second passage tube in one direction, and a third passage tube configured to supply the ink discharged from the ink circuit unit to the ink storage unit.

13 Claims, 2 Drawing Sheets

APPARATUS FOR SUPPLYING INK, AND INKJET PRINTING SYSTEM INCLUDING THE SAME

CROSS-REFERENCE TO RELATED APPLICATION

This application claims priority to Korean Patent Application No. 10-2023-0084477 filed on Jun. 29, 2023 and all the benefits accruing therefrom under 35 U.S.C. § 119, the contents of which are incorporated by reference in their entirety.

BACKGROUND

The present disclosure relates to an apparatus for supplying ink and an inkjet printing system including the same, and more particularly, to an apparatus for supplying ink, which may effectively circulate ink for inkjet printing to stably maintain a state of the ink, and an inkjet printing system including the same.

An inkjet printing method, in which printing is performed by spraying ink in the form of droplets on a surface to be printed, is being used not only for printing documents or leaflets, but also for a solution process in semiconductor or display fields.

A small inkjet printer for drawing up documents stores ink in an inkjet head that discharges ink droplets, but a printer for drawing up large documents or an inkjet printer manufactured for industrial purposes to manufacture electronic components and displays uses a large amount of ink and thus has a structure in which a storage unit for storing the ink and an inkjet head are separated from each other.

In order for an inkjet printing device to be applied to actual industrial purposes, the ink may be ejected accurately to a plurality of nozzle head units to form high-resolution patterns and print ultra-thin films. To achieve these results, it may be necessary to maintain conditions of the ink. In order to maintain the conditions of the ink, it may be necessary to remove air bubbles or foreign substances that may be generated through ink agglomeration, hardening, or gelation, and thus, the air bubbles or foreign substance may be removed to circulate the ink, thereby stably discharging the ink without a limitation such as clogging of the ink or flow instability of the ink.

There are various attempts such as inserting a filter unit into a flow path of the ink or increasing in flow rate of the ink so as to remove the foreign substance generated by the lumping of the ink. However, there is a limitation such as a stagnation phenomenon due to the filter unit or introduction of external air due to a change in pressure required for increasing in flow rate, and thus, there is still a need for an effective technology that is capable of stably maintaining the state of the ink without the stagnation of the ink or the introduction of the external air.

PRIOR ART DOCUMENT

Patent Document (PATENT DOCUMENT 1) Korean Patent Publication No. 10-2008-0098266

SUMMARY

The present disclosure provides an apparatus for supplying ink, which removes bubbles existing in the ink and circulates the ink to stably maintain a state of the ink, and an inkjet printing system including the same.

In accordance with an exemplary embodiment, an apparatus for supplying ink includes: an ink storage unit configured to store ink at least temporarily; a first passage tube configured to supply the ink stored in the ink storage unit to an inkjet head unit; a second passage tube configured to collect the ink from the inkjet head unit; an ink circulation unit configured to move the ink introduced through the second passage tube in one direction; and a third passage tube configured to supply the ink discharged from the ink circuit unit to the ink storage unit.

The ink circulation unit may include: a cylinder part configured to provide a hollow internal space extending in the one direction; a screw part extending in the one direction and inserted into the internal space so as to be rotatably provided; and a motor part configured to selectively rotate the screw part.

The internal space may have a cylindrical shape with the same inner diameter in the one direction, and the screw part may have the same outer diameter in the one direction.

The outer diameter of the screw part may be less than the inner diameter of the internal space and is about 80% or more of the inner diameter of the internal space.

The screw part may include: a shaft part extending in the one direction; and a blade part provided in a spiral shape along an outer wall of the shaft part, wherein each of an outer diameter and a pitch of the blade part may be the same in the one direction.

A spaced space may be defined between one end of the screw part and an inner end of the internal space, and the third passage tube may be connected to the spaced space.

The apparatus may further include: a flow mater configured to measure a flow rate of ink flowing inside the third passage tube; and a controller configured to control at least one of a rotation speed, a rotation rate, or rotation force of the motor part in accordance with a flow rate of the ink, which is measured in the flow meter.

The apparatus may further include: a capacity detection part configured to detect a capacity of the ink stored in the ink storage unit; and an ink supplement part connected to the ink storage unit to supplement insufficient ink when a capacity of the ink detected by the capacity detection part is less than a reference capacity.

The apparatus may further include a negative pressure setting part connected to the ink storage unit to set the internal space of the ink storage unit to a pressure less than atmospheric pressure.

The apparatus may further include a buffer unit that is in communication with the first passage tube and is disposed between the ink storage unit and the inkjet head unit to provide a buffer space having a transverse section greater than that of the first passage tube.

The first passage tube may be provided in plurality, and the third passage tube may have an inner diameter greater than that of the first passage tube.

The ink may include solid contents.

In accordance with another exemplary embodiment, an inkjet printing system includes: an inkjet head unit provided with a plurality of nozzle parts configured to discharge ink onto a substrate; and the apparatus for supplying the ink of claim 1, which is configured to supply the ink to the inkjet head unit.

The inkjet head unit may be provided in plurality.

The first passage tube to the second passage tube may be provided in plurality to correspond to the plurality of inkjet head units, wherein each of the first passage tubes may be connected to one side of the corresponding inkjet head unit, and each of the second passage tubes may be connected to the other side of the corresponding inkjet head units.

[Effects of the Inventive Concept]

In accordance with the apparatus for supplying the ink and the inkjet printing system including the same, the bubbles existing in the ink or the flow path of the ink may be removed to stably supply the ink to the inkjet head unit without interrupting the flow of the ink.

In the case of the ink that contains the various solid contents mixed into the ink to give the various functions to the applied coating layer or are lumped together or are hardened or gelated when the flow thereof is interrupted or stagnated, the ink may be continuously circulated between the inkjet head unit and the ink storage unit and thus may be uniformly stirred to continuously maintain the state of the ink. Furthermore, the precipitation of the solid contents contained in the ink, the lumping of the ink, and the local hardening or gelation of the ink may be suppressed to prevent the inkjet head unit from being damaged by the blocking of the nozzle part due to the above-described phenomena.

In addition, the bubbles in the ink and the flow path of the ink may be removed, and the rapid pressure change or the pulsation phenomena in the ink storage unit and the flow path of the ink may be suppressed to form and maintain the accurate meniscus, thereby effectively improving the discharge stability of the ink and the accuracy of the impact position of the ink.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
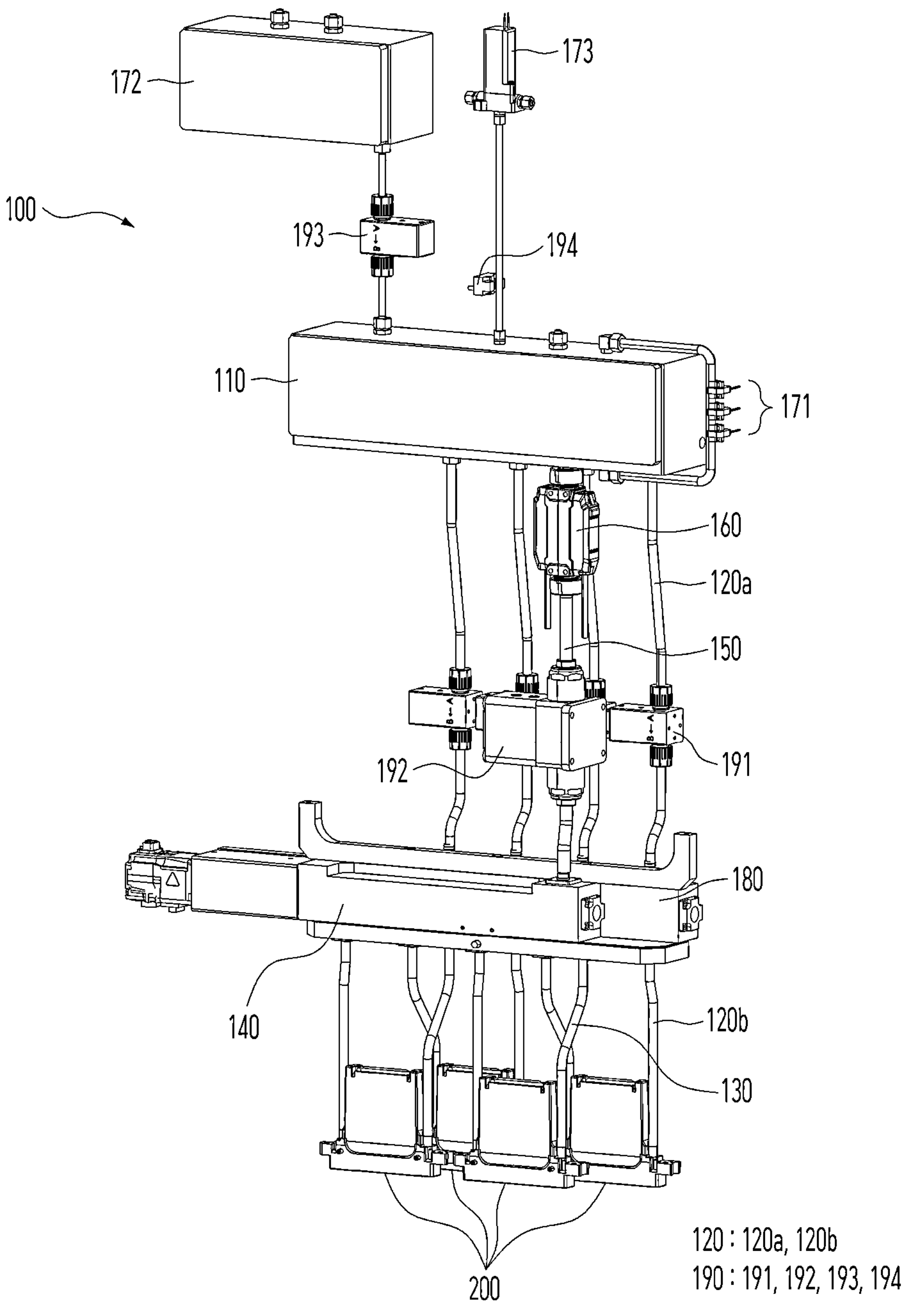
FIG. 1 is a view illustrating configurations of an apparatus for supplying ink and an inkjet printing system in accordance with an exemplary embodiment.

Hereinafter, specific embodiments will be described in more detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present inventive concept to those skilled in the art. In the descriptions, the same elements are denoted with the same reference numerals. In the figures, the dimensions of layers and areas are exaggerated for clarity of illustration. Like reference numerals refer to like elements throughout.

Figure 2:
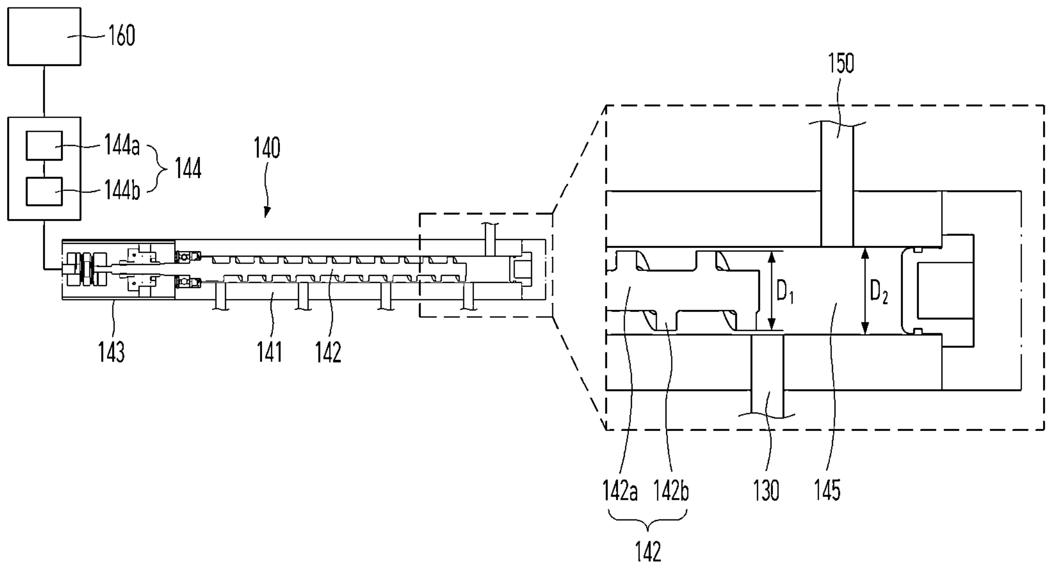
FIG. 2 is a view illustrating an ink circulation unit of the apparatus for supplying the ink in accordance with an exemplary embodiment.

FIG. 1 is a view illustrating configurations of an apparatus for supplying ink and an inkjet printing system in accordance with an exemplary embodiment, and FIG. 2 is a view illustrating an ink circulation unit of the apparatus for supplying the ink in accordance with an exemplary embodiment.

Referring to FIGS. 1 and 2, an apparatus for supplying ink in accordance with an exemplary embodiment may include an ink storage unit 110 that stores ink at least temporarily, a first passage tube 120 that supplies the ink stored in the ink storage unit 110 to an inkjet head unit 200, a second passage tube 130 that collects the ink from the inkjet head unit 200, an ink circulation unit 140 that moves the ink introduced through the second passage tube 130 in one direction; and a third passage tube 150 that supplies the ink discharged from the ink circulation unit 140 to the ink storage unit 110.

The ink storage unit 110 may have an internal space for at least temporarily storing the ink and may be connected to a plurality of passage tubes through which the ink is introduced into and discharged from the internal space. A partition wall may be provided in the internal space so that the ink is mixed itself while flowing to be introduced and discharged. In general, the internal space may not be fully filled with the ink, and a portion of the internal space may be maintained as an empty space.

The first passage tube 120 may be connected to the ink storage unit 110 to provide a passage through which the ink stored in the ink storage unit 110 is supplied to the inkjet head unit 200.

The second passage tube 130 may provide a passage through which at least a portion of the ink supplied to the inkjet head unit 200 is collected. When the inkjet head unit 200 ejects the ink for a printing operation, the remaining ink may be collected from the ink supplied to the inkjet head unit 200, and when the inkjet head unit 200 does not perform the printing operation and is on standby, the entire ink supplied to the inkjet head unit 200 may be collected.

One side of the ink circulation unit 140 may be connected to the second passage tube 130 to serve to move the ink introduced through the second passage tube 130 in one direction. The ink introduced through the second passage tube 130 may move in one direction to define a space into which the ink remaining in the inkjet head unit 200 is introduced so that the ink continuously flows in one direction.

The third passage tube 150 may be connected to the other side of the ink circulation unit 140 to move in one direction by the ink circulation unit 140, thereby providing a passage through which the ink discharged from the ink circulation unit 140 is supplied to the ink storage unit 110.

While the ink is continuously circulated along a circulation path that is connected to the ink storage unit 110 again from the ink storage unit 110 through the first passage tube 120, the inkjet head unit 200, the second passage tube 130, the ink circulation unit 140, and the third passage tube 150, the ink may continuously flow to improve dispersibility of the ink, and thus, uniformity of the ink may be maintained. In addition, while the ink is continuously circulated along the circulation path, air existing in not only the ink but also the circulation path may also move together with the circulation of the ink and then be discharged into the empty space inside the ink storage unit 110.

The apparatus 100 for supplying the ink may further include a negative pressure setting part connected to the ink storage unit 110 to set the internal space of the ink storage unit 110 to a pressure less than an atmospheric pressure. In addition, the negative pressure setting part 173 may be provided with an exhaust part that exhausts the internal space to adjust a pressure of the internal space of the ink storage unit 110. Thus, air existing in the ink or the circulation path may also move together with the circulation of the ink and be discharged to the empty space inside the ink storage unit 110 and then be exhausted to the outside by the exhaust part of the negative pressure setting part 173.

In order to form an accurate dot by ejecting a fixed amount of ink in position, a negative pressure may be applied to the internal space of the ink storage unit 110 so that a meniscus state that is a curved state, in which ink is concave inward by a capillary action at an inlet of a nozzle part of the inkjet head unit 200 is maintained. The negative pressure setting part 173 may adjust the pressure of the internal space of the ink storage unit 110 to set the pressure to a pressure less than the atmospheric pressure. When the negative pressure setting part 173 sets the internal space of the ink storage unit 110 to the negative pressure, except that the first passage tube 120, the inkjet head unit 200, the second passage tube 130, the ink circulation unit 140, and the third passage tube 150 are filled with the ink, or the ink moves, the entire passage through which the ink flows may be maintained in an airtight state, and thus, the meniscus state of the ink may be maintained at the inlet of the nozzle part.

If the ink itself or solid contents existing inside the ink is partially coagulated to block a flow path of the ink passage, or if air exists in the flow path of the ink, the negative pressure may not be transferred up to the inlet of the nozzle part in the internal space of the ink storage unit 110 set by the negative pressure setting part 173, and thus, the meniscus state may not be maintained. However, in accordance with the exemplary embodiment, the ink may be continuously circulated through the circulation path without additional equipment to maintain a uniform ink state, thereby effectively suppressing partial agglomeration, and also, the air may be discharged to the outside to effectively maintain or control the meniscus state at the inlet of the nozzle part due to the negative pressure set by the negative pressure setting part 173.

In order to circulate the ink along the circulation path, driving force for the ink to move has to be provided. To move the liquid ink, a pressure (a positive pressure is applied from a rear side, or a negative pressure is applied from a front side) may be applied to the ink in a direction in which the ink moves, and thus, a variety of pumps may be available to move the ink. For example, a pump including an impeller may be used, or a plurality of piezoelectric pumps may be provided to constitute a pump module. The above-described general circulation pumps may generate a differential pressure in the circulation path of the ink to move the ink. Thus, the negative pressure set in the internal space of the ink storage unit 110 may not be uniformly transferred to the ink existing at the inlet of the nozzle part due to the pressure change generated in the circulation path of the ink, and thus, the meniscus state may not be maintained at the inlet of the nozzle part. In addition, the circulation pump may generate a pulsation phenomenon in which the pressure is periodically changed during an operation of the pump. Due to the pulsation phenomenon, it may be more difficult to control the meniscus state at the inlet of the nozzle part. That is, if the general circulation pump is installed in the circulation path of the ink, which includes the inkjet head unit 200, it may be difficult to precisely maintain and control the meniscus at the inlet of the nozzle part of the inkjet head unit.

To solve this limitation, the ink may be circulated only between the ink storage unit and the inkjet head unit in a state of blocking the nozzle part of the inkjet head unit or bypassing the nozzle part of the inkjet head unit. However, for this purpose, a blocking valve or a bypass passage may be additionally installed, and thus, an equipment configuration may be complicated, and the ink may not be purified and stagnated in the nozzle part of the inkjet head, which is a section in which the ink is directly ejected in an actual inkjet printing operation.

The ink circulation unit 140 may include a cylinder part 141 that provides a hollow internal space extending in the one direction, a screw part 142 extending in the one direction, inserted into the internal space, and rotatably provided, and a motor part 143 that selectively rotates the screw part 142.

In the present disclosure, the ink circulation unit 140 may be inserted and installed into the ink flow path through which the ink is supplied, discharged, and collected when performing the inkjet printing operation, and thus, the ink circulated by the ink circulation unit 140 may be circulated through the nozzle part of the inkjet head unit 200 without blocking or bypassing the nozzle part of the inkjet head unit 200.

The cylinder part 141 may provide the hollow internal space extending in the one direction to a space in which the ink flows in the one direction between the second passage tube 140 and the third passage tube 150. While the ink is circulated, the internal space of the cylinder part 141 may be completely filled with the ink.

The screw part 142 may have a shape extending in the one direction and also be inserted into the internal space extending in the one direction and be rotatably provided. The motor part 143 may provide rotational force to the screw part 142 to selectively rotate the screw part 142.

When the screw part 142, which has the shape extending in the one direction, is inserted into the hollow internal space provided in the cylinder part 141, which provides a flow space of the ink, to continuously rotate, the ink introduced into the cylinder part 141 may move along a blade part provided in a spiral shape along a screw axis of the screw part 142. In other words, the ink having a consistent volumetric flow rate may move stably and continuously by the screw part 142 rotating at a constant speed without the need to generate a sudden pressure change (differential pressure) in the flow path, like the general circulation pump. In addition, since the ink is pushed to move naturally by the screw part 142 that continuously rotates in one direction, the pulsation phenomenon of the general circulation pump may be completely excluded or significantly suppressed.

Therefore, in accordance with an exemplary embodiment, the sudden pressure changes and the pulsation phenomenon may be effectively suppressed, and thus, a weak negative pressure may be applied to the ink storage unit 110 to precisely maintain or control the meniscus state in the nozzle part of the inkjet head unit 200, thereby enabling the stable ink ejection and inkjet printing.

In order to precisely control the meniscus state of the ink using the weak negative pressure applied to the ink storage unit 110, the ink flowing in the ink circulation unit 140 may naturally move in accordance with the rotation of the screw part 142 without undergoing the rapid pressure change and the pulsation phenomenon (periodic pressure change). For this, the internal space of the cylinder part 141 may have a cylindrical shape with the same inner diameter along the one direction, and the screw part 142 may have the same outer diameter along the one direction.

In the present disclosure, the same size of components may not mean that the components are physically completely the same, but mean that the components are the same including a processing tolerance.

If an inner diameter of the internal space of the cylinder part 141 and an outer diameter of the screw part 142 are the same along one direction, which is a moving direction of the ink, the moving ink may be constantly pushed to naturally move only by the blade part of the screw part 142 that rotates without undergoing any change in pressure along the one direction.

The screw part 142 may include a shaft part **142*a* extending in the one direction, and a blade part 142*b* provided to form a spiral shape along an outer wall of the shaft part 142***a*, and an outer diameter and a pitch of the blade part 142*b* may be the same along the one direction.

One end of the shaft part 142*a* may be connected to the motor part 143 that provides rotational force to rotate by receiving the rotational force. The blade part 142*b* may be provided in the form of the spiral shape along the outer wall of the rotating shaft part 142*a*. The shaft part 142*a* and the blade part 142*b* may be provided to be integrated with each other or may be assembled in an assembled manner. Here, the outer diameter and the pitch of the blade part 142*b* may be the same along the one direction. The outer diameter of the blade part 142*b* may be a height from the outer wall of the shaft part 142*a*, and the pitch may be an interval when the blade part 142*b* is disposed at the same angular position. The driving force required for the ink to move in one direction may be pushing force generated by the rotating blade part 142*b*. Therefore, in order for the ink to move constantly along one direction, the outer diameter and PD of the blade part 142*b* have be the same along one direction. In particular, as will be described later, in the inkjet printing system including the plurality of inkjet head units 200, the ink may be introduced into the ink circulation unit 140 through a plurality of second passage tubes 130 that are respectively connected to the plurality of inkjet head units 200. Thus, in order for the inks introduced through the different paths to move naturally without undergoing a large pressure change, constant driving force has to be transferred to the ink regardless of the introduction passage. That is, even if the plurality of second passage tubes 130 are connected to the internal space of the cylinder part 141 at regular intervals along one direction, the ink introduced through each second passage tube 130 may be pushed at the constant force in one direction by the blade part 142*b* having the same outer diameter and pitch along one direction to constantly move.

The outer diameter D1 of the screw part 142 may be less than an inner diameter D2 of the internal space of the cylinder part 141 and may be about 80% or more of the inner diameter D2 of the internal space. In this case, the ink existing in the space surrounded by the inner wall of the cylinder part 141 and the blade part 142*b* of the screw part 142*b* may be pushed in accordance with the rotation of the blade part 142*b* to effectively move in one direction.

From the viewpoint of transferring of force, it may be most effective when the outer diameter D1 of the screw part 142 and the inner diameter D2 of the internal space are the same. However, when the outer diameter D1 of the screw part 142 and the inner diameter D2 of the internal space are the same, the rotating screw part 142 may be caught in the inner wall of the cylinder part 141, and thus, the rotation of the screw part 142 may not be continuously maintained, or the cylinder part 141 or the screw part 142 may be damaged. On the other hand, when the outer diameter D1 of the screw part 142 is less than about 80% of the inner diameter D2 of the internal space, the ink pushed as the screw part 142 rotates may not be supported by the inner wall of the cylinder part 141, and thus, a portion of the ink may not move along the one direction, but be stagnated along the inner wall of the cylinder part 141 to deteriorate circulation efficiency.

A spaced space 145 may be provided between one end of the screw part 142 and an inner end of the internal space of the cylinder part 141, and the third passage tube 150 may be connected to the spaced space 145.

When the third passage tube 150 may be provided at one end of the screw part 142 so that the ink moving along the blade part 142*b* of the rotating screw part 142 reaches the one end of the screw part 142 and then be immediately discharged through the third passage tube 150, the position of the blade part 142*b* may be changed as the screw part 142 rotates, and thus, the ink may not be uniformly discharged to the third passage tube 150. In order to solve this limitation, one end of the screw part 142 may not be in contact with or is close to the inner end of the internal space of the cylinder part 141, but one end of the screw part 142 and the inner end of the internal space of the cylinder part 141 may be spaced apart from each other to provide the spaced space 145 so that the ink reaching one end of the screw part 142 is stabilized via the spaced space 145 and then is pushed by the constant volumetric flow rate so as to be discharged to the third passage tube 150. In the spaced space 145 to which the third passage tube 150 is connected, a spaced distance between the one end of the screw part 142 and the inner end of the internal space of the cylinder part 141 may be greater than an inner diameter of the third passage tube 150 to secure a sufficient space in which the ink is separated from the one end of the rotating screw part 142 and stabilized.

The apparatus 100 for supplying the ink may further include a flow meter 160 that measures a flow rate of ink flowing inside the third passage tube 150, and a controller 144 that controls at least one of a rotation speed, a rotation rate, or rotation force of the motor part 143 in accordance with the flow rate of the ink measured by the flow meter 160.

The flow meter 160 may measure the flow rate of the ink discharged from the ink circulation unit 140 to flow inside the third passage tube 150 to monitor the circulation state of the ink within the apparatus for supplying the ink by the ink circulation unit 140. If the flow rate of the circulating ink is too high, abrasion of the components constituting the circulation passage may occur, and also, the sudden pressure change may occur. As a result, it may be difficult to control the meniscus state at the inlet of the nozzle part. On the other hand, if the flow rate of the circulated ink is too small, a sufficient effect of removing air through the ink circulation or homogenizing the ink by stirring may not be obtained. Therefore, it is necessary to monitor whether the ink is circulated at a preset flow rate within the apparatus for supplying the ink.

The flow meter 160 may be installed in other paths through which the ink is circulated (for example, the first passage tube 120, etc.), but measure the flow rate of ink circulated downstream of the ink circulation unit 140 to not only directly confirm the circulation state of the ink, but also maintain the flow mater 160 as it is even though the passage such as the first passage tube 120 is changed to correspond to the plurality of inject head units as described below.

The flow meter 160 may be a non-contact flow meter that is mounted in a clamp-on manner on the outer wall of the third passage tube 150 so as not to interrupt the flow of the ink flowing inside the third passage tube 150 so as to measure the flow rate of the ink. For example, the flow meter 160 may be a non-contact ultrasonic flow meter that measures the flow rate by measuring a difference in arrival time of ultrasonic waves using ultrasonic sensors installed at different positions along a flow direction of a fluid (ink) and may be a non-contact ultrasonic flow meter that measures a flow rate of the fluid (ink) by measuring a difference in temperature at two points by using temperature sensors installed at different positions along the flow direction of the fluid.

The controller 144 may be connected to the flow meter 160 and the motor part 143 to monitor the flow rate of the ink measured by the flow meter 160, thereby controlling at least one of the rotation speed, the rotation rate, or the rotation force of the motor part 143 in accordance with the flow rate of the ink measured by the flow meter 160.

The controller 144 may include a flow rate determination part 144*a* that compares a preset flow rate with the ink flow rate measured by the flow meter 160 to determine whether the flow rate of the circulating ink is within a normal range, and a driving controller 144*b* that controls at least one of the rotation speed, the rotation rate, or the rotation force of the motor part 143 when it is determined that the ink flow rate measured by the flow rate determination part 144*a* is out of the normal range. If it is determined that the ink flow rate measured by the flow rate determination part 144*a* is within the normal range, the drive controller may maintain the current operating state of the motor part 143.

The ink discharged from the ink circulation unit 140 may be supplied to the ink storage unit 110 through the third passage tube 150 so that the ink is continuously circulated along the circulation passage. The ink introduced and collected through the third passage tube 150 connected to one position of the ink storage unit 110 may flow from one position to the other position of the ink storage unit 110 so as to be stirred while being discharged through the first passage tube 120 connected to the other position of the ink storage unit 110. In addition, in order to further increase in stirring effect, a partition wall crossing (e.g., vertical direction) the flow path may be provided between one position and the other position to allow the ink to be continuously mixed while flowing. Here, the partition wall may be disposed to be at least partially spaced apart from the inner wall of the ink storage unit 110 so that the ink flows through a space between the partition wall and the inner wall of the ink storage unit 110. In addition, the air contained in the ink collected through the third passage tube 150 may be separated from the ink as the ink flows inside the ink storage unit 110 and then be removed by the negative pressure setting part 173 connected to the ink storage unit 110. If the partition wall is provided inside the ink storage unit, the air contained in the ink may be separated more effectively as the ink collides with the partition wall to bypass the partition wall, and thus, the air may be exhausted very easily.

The apparatus 100 for supplying the ink may further include a capacity detection part 171 that detects a capacity of the ink stored in the ink storage unit 110, and an ink supplement part 172 that is connected to the ink storage unit 110 to supplement insufficient ink when the capacity of the ink detected by the capacity detection part 171 is less than a reference capacity.

The capacity detection part 171 may detect the capacity of the ink stored in the ink storage unit 110 to confirm whether a certain level of ink is stored in the ink storage unit 110 so that the ink is stably discharged from the inkjet head unit 200. The ink capacity may be measured using a level sensor that measures a height of a surface of the ink stored in the ink storage unit 110, but the ink capacity is not limited thereto. For example, the ink capacity may be detected in various manners.

If the ink capacity detected by the capacity detection part 171 is less than the reference capacity, the ink supplement part 172 may supply the ink to supplement the ink that is insufficient in the ink storage unit 110. For inkjet printing operation, the ink discharged from the inkjet head unit 200 to gradually decrease in amount may be supplemented to maintain the capacity of the ink stored in the ink storage unit 110 at a constant level. The ink supplement part 172 may be connected to an external storage tank that stores ink in an external device to supply the ink stored in the external storage tank to the ink storage unit 110.

The apparatus 100 for supplying the ink may further include a buffer unit 180 that is in communication with the first passage tube 120 and is disposed between the ink storage unit 110 and the inkjet head unit 200, thereby providing a buffer space having a transverse section greater than that of the first passage tube 120.

In general, the inkjet printing system may include a plurality of inkjet head units and require a plurality of first passage tubes 120 to respectively supply ink to the plurality of inkjet head units 200. When the plurality of first passage tubes 120 are respectively connected to the ink storage units 110 so that the ink is purified along the circulation passage, flow rates of the ink moving through the plurality of first passage tubes 120 may be different from each other in accordance with the connection positions of the ink storage unit 110. In addition, when the negative pressure is set in the ink storage unit 110 to control the meniscus state at the inlet of the nozzle part of the inkjet head unit 200, the negative pressure may be transferred through the plurality of first passage tubes 120. Here, a magnitude of the negative pressure transferred through each of the first passage tubes 120 may vary. If the flow rate or negative pressure of the ink moving through the plurality of first passage tubes 120 varies, a state of the ink discharged from the plurality of head jet heads 200 may also vary depending on the position, and thus, it may be difficult to secure the uniform printing quality.

The buffer unit 180, which communicates with the first passage tube 120 and provides a buffer space having the transverse section greater than that of the first passage tube 120, may be disposed between to the ink storage unit 110 and the inkjet head unit 200 so the ink flowing through the first passage tube 120 is introduced into the buffer space, which is a space wider than the first passage tube 120, and then is mixed and homogenized, and thus, the negative pressure applied to the first passage tube 120 may also be constant. That is, the buffer unit 180 may be connected to the plurality of first passage tubes 120 to provide the buffer space, which is a common space, to homogenize the ink, etc., and thus, the ink may be supplied to the plurality of inkjet head units 200 through the plurality of first passage tubes 120 downstream. The first passage tube 120 may be divided into an upstream first passage tube 120*a* and a downstream first passage tube 120*b* with respect to the buffer unit 180. The homogenized ink may flow through the downstream first passage tube 120*b*, and a uniform negative pressure may be transferred to each inkjet head unit 200.

The first passage tube 120 may be provided in plurality, and the inner diameter of the third passage tube 150 may be greater than the inner diameter of the first passage tube 120. Even if the ink is collected from the plurality of inkjet head units 200, the ink may be collected in the ink circulation unit 140 and then be discharged to be supplied to the ink storage unit 110 through the third passage tube 150. Thus, if the ink is not consumed, such as being ejected, from the inkjet head units 200, ink having the same flow rate as the collected ink may be supplied to the inkjet head unit 200 through the first passage tube 120. Since the ink moving through the third passage tube 150 that provides a single passage is circulated through each of the plurality of first passage tubes 120, the third passage tube 150 may have an inner diameter greater than that of each of the plurality of first passage tubes 120 so that the first passage tube 120 and the third passage tube, which constitute the circulation passage, do not interrupt the circulation of the ink. For precise comparison, the inner diameter of the third passage tube 150 and the inner diameter of each of the plurality of first passage tubes 120 may be of the same height.

In the present disclosure, the ink may contain a solid content.

Industrial inkjet printing systems used in the manufacture of electronic products such as display devices may use ink that contains materials needed to manufacture components, simply with or instead of pigments. In order to provide necessary functionality to some portions of electrical and electronic components such as a display panel, various solid contents may be contained in the ink. For example, ink containing quantum dot materials or nanorods that may exhibit various optical properties, a polymer resin as an insulating material, and metallic copper for conductivity may be used. As described above, ink for the inkjet printing system used in the industrial fields may contain various components including liquid components and solid components with different specific gravity, and thus, it may be difficult to maintain dispersibility of various materials contained in the ink by simply adding a dispersant. Thus, the apparatus for supplying the ink in accordance with an exemplary embodiment may not only remove the air existing in the ink by allowing the ink to be continuously circulated in the ink circulation path including the inkjet head unit 200 for the printing in the inkjet printing system, but also uniformly mix and maintain the various components contained in the solid content existing in the ink.

The apparatus 100 for supplying the ink may include a plurality of valves 190 (191, 192, 193, and 194) that are provided in the passage tubes, through which the ink flows, including the first passage tube 120 to the third passage tube 150 and between the ink storage unit 110 and the negative pressure setting part 173 to variously control the flow rate and exhaust amount of the ink as necessary. The controller 144 may be connected to the capacity detection part 171, the flow meter 160, and the plurality of valves 191 to 194 to generate and transfer a control signal for controlling the plurality of valves 191 to 194 by using a measurement signal measured by the capacity detection part 171, thereby turning on/off the plurality of valves 191 to 194 or adjusting the flow rate.

For example, in a process of filling the ink storage unit 110 with the ink to an appropriate capacity, the valve 193 provided between the ink supplement part 172 and the ink storage unit 110 may be opened, and the valves 191 and 192 provided in the first passage tube 120 to the third passage tube 150 may be closed. When the ink stored in the ink storage unit 110 reaches the appropriate capacity, the valve 193 may be closed, and then, the valve 194 provided between the ink storage unit 110 and the negative pressure setting part 173 and the valves 191 and 192 provided between the first passage tube 120 to the third passage tubes 150 may be opened.

Referring to FIGS. 1 and 2, an inkjet printing system in accordance with another embodiment may include an inkjet head unit 200 provided with a plurality of nozzle parts for discharging ink onto a substrate, and an apparatus 100 for supplying ink in accordance with an embodiment, which supplies the ink to the inkjet head unit 200.

In description of the inkjet printing system in accordance with another embodiment, details that overlapping those previously described with respect to the apparatus 100 for supplying the ink in accordance with an exemplary embodiment will be omitted.

The inkjet printing system may spray ink that is in a solution containing various functional materials onto the substrate through a plurality of nozzles provided in the inkjet head unit 200 to form a coating layer so as to perform printing.

In the case of large-area substrates, it may be difficult to manufacture a head unit that includes a plurality of nozzle parts corresponding to a substrate area, and also, forming of an operation space for the inkjet printing by spraying the ink through the plurality of nozzle parts, such as providing of a large chamber, may be vary cumbersome in many aspects.

The plurality of nozzle parts provided in the inkjet head unit 200 may be arranged along a first direction, and thus, the inkjet head unit 200 or the substrate may move in a second direction crossing the first direction to form a uniform coating layer over a large area even using a small inkjet printing system on a large-area substrate.

The inkjet printing system manufactured for industrial to manufacture electronic components and displays may use a large amount of ink in response to the large-area substrate and thus may have a structure in which an apparatus 100 for supplying the ink that stores the ink and stably supplies the ink and the inkjet head unit 200 are separated from each other.

The inkjet head unit 200 may be provided with a plurality of nozzle parts that discharge the ink onto the substrate for the printing. The inkjet head unit 200 may operate in a thermal method, in which the ink is heated by using a fine heating wire to increase in volume and discharge the ink as much as the increasing volume and a piezo method, in which an ink applying a pressure is discharged inside the head by using a piezoelectric element that be deformed while applying a voltage, but are not limited thereto.

The apparatus 100 for supplying the ink may include an ink storage unit 110 that stores ink at least temporarily, a first passage tube 120 that supplies the ink stored in the ink storage unit 110 to an inkjet head unit 200, a second passage tube 130 that collects the ink from the inkjet head unit 200, an ink circulation unit 140 that moves the ink introduced through the second passage tube 130 in one direction; and a third passage tube 150 that supplies the ink discharged from the ink circulation unit 140 to the ink storage unit 110.

In accordance with the apparatus 100 for supplying the ink, the ink may be supplied to the inkjet head unit 200 while circulating the ink using the same circulation passage to remove bubbles existing in the ink and stably maintaining a homogeneous state of the ink without distinguishing the ink circulation passage for printing from the ink circulation passage for stirring during standby, and thus, the ink may be very stably and accurately discharged from the inkjet head unit 200 to improve printing quality.

The inkjet printing system in accordance with another exemplary embodiment may include a plurality of inkjet head units 200. The plurality of inkjet head units 200 may be arranged in various arrangements in accordance with various purposes. When printing is performed on a large-area substrate, a single inkjet head unit 200 may not cover a large area, and thus, the plurality of inkjet head units 200 may be arranged in the first direction, and the inkjet head units 200 or the substrate may move relatively. Alternatively, since an interval between the plurality of nozzle parts provided in the inkjet head unit 200 is fixed, in the case in which the ink needs to be ejected at a narrower interval (i.e., high resolution printing is required), the plurality of inkjet head units may be spaced apart from each other in a second direction crossing the first direction, and a plurality of nozzle parts may not overlap each other, and thus, the inkjet head unit 200 or the substrate may relatively move for the printing.

In response to the plurality of inkjet head units 200, there are a plurality of first passage tubes 120 that supply the ink to the inkjet head units 200 and a plurality of second passage tubes 130 that collect the ink from the inkjet head units 200. Each of the first passage tubes 120 may be connected to one side of the corresponding inkjet head unit 200, and each of the second passage tubes 130 may be connected to the other side of the corresponding inkjet head unit 200. In order to ensure a uniform flow of ink within the inkjet head unit 200, one side and the other side at which the first passage tube 120 and the second passage tube 130 are respectively connected may be provided at the same position in the inkjet head unit 200.

In accordance with the apparatus for supplying the ink and the inkjet printing system including the same, the bubbles existing in the ink or the passage of the ink may be effectively removed to stably supply the ink to the inkjet head part without interrupting the flow of the ink.

In the case of the ink that contains the various solid contents mixed into the ink to give the various functions to the applied coating layer or are lumped together or are hardened or gelated when the flow thereof is interrupted or stagnated, the ink may be continuously circulated between the inkjet head unit and the ink storage unit and thus may be uniformly stirred to continuously maintain the state of the ink. Furthermore, the precipitation of the solid contents contained in the ink, the lumping of the ink, and the local hardening or gelation of the ink may be suppressed to prevent the inkjet head unit from being damaged by the blocking of the nozzle part due to the above-described phenomena.

In addition, the bubbles in the ink and the flow path of the ink may be removed, and the rapid pressure change or the pulsation phenomena in the ink storage unit and the flow path of the ink may be suppressed to form and maintain the accurate meniscus, thereby effectively improving the discharge stability of the ink and the accuracy of the impact position of the ink.

Furthermore, in the inkjet printing system, the ink may be continuously circulated using the ink circulation passage including the inkjet head unit, which supplies the ink for the printing, thereby removing the air bubbles that may exist within the inkjet head unit and effectively preventing the agglomeration of the solid contents, thereby allowing the ink to be smoothly circulated and improving the printing quality.

The term '~ on' the above description includes direct contact and indirect contact at a position that is opposite to an upper and lower portion. It is also possible to locate not only the entire top surface or the entire bottom surface but also the partial top surface or the bottom surface, and it is used in the mean that it is opposed in position or contact directly to upper or bottom surface. In addition, terms such as 'top', 'bottom', 'front end', 'rear end', 'upper portion', 'lower portion', 'upper end', 'lower end, etc. used in the above description are defined based on the drawings for convenience, the shape and location of each component are not limited by this term.

Although embodiments have been described with reference to a number of illustrative embodiments thereof, the embodiments are not limited to the foregoing embodiments, and thus, it should be understood that numerous other modifications and embodiments may be devised by those skilled in the art that will fall within the spirit and scope of the principles of this disclosure. Hence, the real protective scope of the present inventive concept shall be determined by the technical scope of the accompanying claims.

What is claimed is:

1. An apparatus for supplying ink, comprising:

an ink storage unit configured to store ink at least temporarily;

a first passage tube configured to supply the ink stored in the ink storage unit to an inkjet head unit;

a second passage tube configured to collect the ink from the inkjet head unit;

an ink circulation unit configured to move the ink introduced through the second passage tube in one direction; and a third passage tube configured to supply the ink discharged from the ink circulation unit to the ink storage unit, wherein the ink circulation unit comprises:

a cylinder part configured to provide a hollow internal space extending in the one direction;

a screw part extending in the one direction and inserted into the internal space so as to be rotatably provided; and a motor part configured to selectively rotate the screw part, wherein the internal space has a cylindrical shape with the same inner diameter in the one direction, and the screw part has the same outer diameter in the one direction, wherein the ink filling the internal space is moved in the one direction by being pushed by the rotating screw part.

2. The apparatus of claim 1, wherein the outer diameter of the screw part is less than the inner diameter of the internal space and is about 80% or more of the inner diameter of the internal space.

3. The apparatus of claim 1, wherein the screw part comprises:

a shaft part extending in the one direction; and a blade part provided in a spiral shape along an outer wall of the shaft part, wherein each of an outer diameter and a pitch of the blade part is the same in the one direction.

4. The apparatus of claim 1, wherein a spaced space is defined between one end of the screw part and an inner end of the internal space, and the third passage tube is connected to the spaced space.

5. The apparatus of claim 1, further comprising:

a flow meter configured to measure a flow rate of ink flowing inside the third passage tube; and a controller configured to control at least one of a rotation speed, a rotation rate, or rotation force of the motor part in accordance with a flow rate of the ink, which is measured in the flow meter.

6. The apparatus of claim 1, further comprising:

a capacity detection part configured to detect a capacity of the ink stored in the ink storage unit; and an ink supplement part connected to the ink storage unit to supplement insufficient ink when a capacity of the ink detected by the capacity detection part is less than a reference capacity.

7. The apparatus of claim 1, further comprising a negative pressure setting part connected to the ink storage unit to set the internal space of the ink storage unit to a pressure less than atmospheric pressure.

8. The apparatus of claim 1, further comprising a buffer unit that is in communication with the first passage tube and is disposed between the ink storage unit and the inkjet head unit to provide a buffer space having a transverse section greater than that of the first passage tube.

9. The apparatus of claim 1, wherein the first passage tube is provided in plurality, and the third passage tube has an inner diameter greater than that of the first passage tube.

10. The apparatus of claim 1, wherein the ink comprises solid contents.

11. An inkjet printing system comprises:

an inkjet head unit provided with a plurality of nozzle parts configured to discharge ink onto a substrate; and the apparatus for supplying the ink of claim 1, which is configured to supply the ink to the inkjet head unit.

12. The inkjet printing system of claim 11, wherein the inkjet head unit is provided in plurality.

13. The inkjet printing system of claim 12, wherein the first passage tube to the second passage tube are provided in plurality to correspond to the plurality of inkjet head units, wherein each of the first passage tubes is connected to one side of the corresponding inkjet head unit, and each of the second passage tubes is connected to the other side of the corresponding inkjet head units.

* * * * *